United States Patent [19]

Isenhart

[11] Patent Number: 4,802,264
[45] Date of Patent: Feb. 7, 1989

[54] TWISTED CARABINER

[76] Inventor: Kyle Isenhart, Rte. 2, Box RS1, Little Hocking, Ohio 45742

[21] Appl. No.: 130,030

[22] Filed: Dec. 8, 1987

[51] Int. Cl.$^4$ ............................................. A44B 13/00
[52] U.S. Cl. .............................. 24/241 P; 24/232 R; 24/234; 24/242
[58] Field of Search ................. 24/241, 241 S, 241 P, 24/241 PS, 241 SP, 242, 232 R, 233, 234, 235, 241 PP, 241 PL, 241 SL

[56]  References Cited

U.S. PATENT DOCUMENTS

| 28,669 | 6/1860 | Henshaw | 24/234 |
|---|---|---|---|
| 453,877 | 6/1891 | Bonfoey | 24/232 X |
| 594,335 | 11/1897 | Donaldson | 24/233 X |
| 1,085,455 | 1/1914 | McCaul | 24/242 |
| 1,457,987 | 6/1923 | Mickelson | 24/241 PL |
| 2,098,466 | 11/1937 | Rodenbach | 24/234 |
| 3,563,430 | 2/1971 | Forrest | 24/233 X |
| 4,095,316 | 6/1978 | Gabriel | 24/234 |

FOREIGN PATENT DOCUMENTS

| 14687 | 1/1904 | Austria | 24/241 SP |
|---|---|---|---|
| 4952 | of 1904 | United Kingdom | 24/241 SP |

Primary Examiner—Kenneth J. Dorner
Assistant Examiner—Laurie K. Cranmer
Attorney, Agent, or Firm—Charles W. Fallow; Martin P. Hoffman; Mitchell B. Wasson

[57]  ABSTRACT

A twisted carabiner comprises substantially straight back section with arcuate ends lying in substantially perpendicular planes and a gate extending between the ends so as to enable one to interconnect devices lying in different planes.

6 Claims, 1 Drawing Sheet

U.S. Patent     Feb. 7, 1989     4,802,264
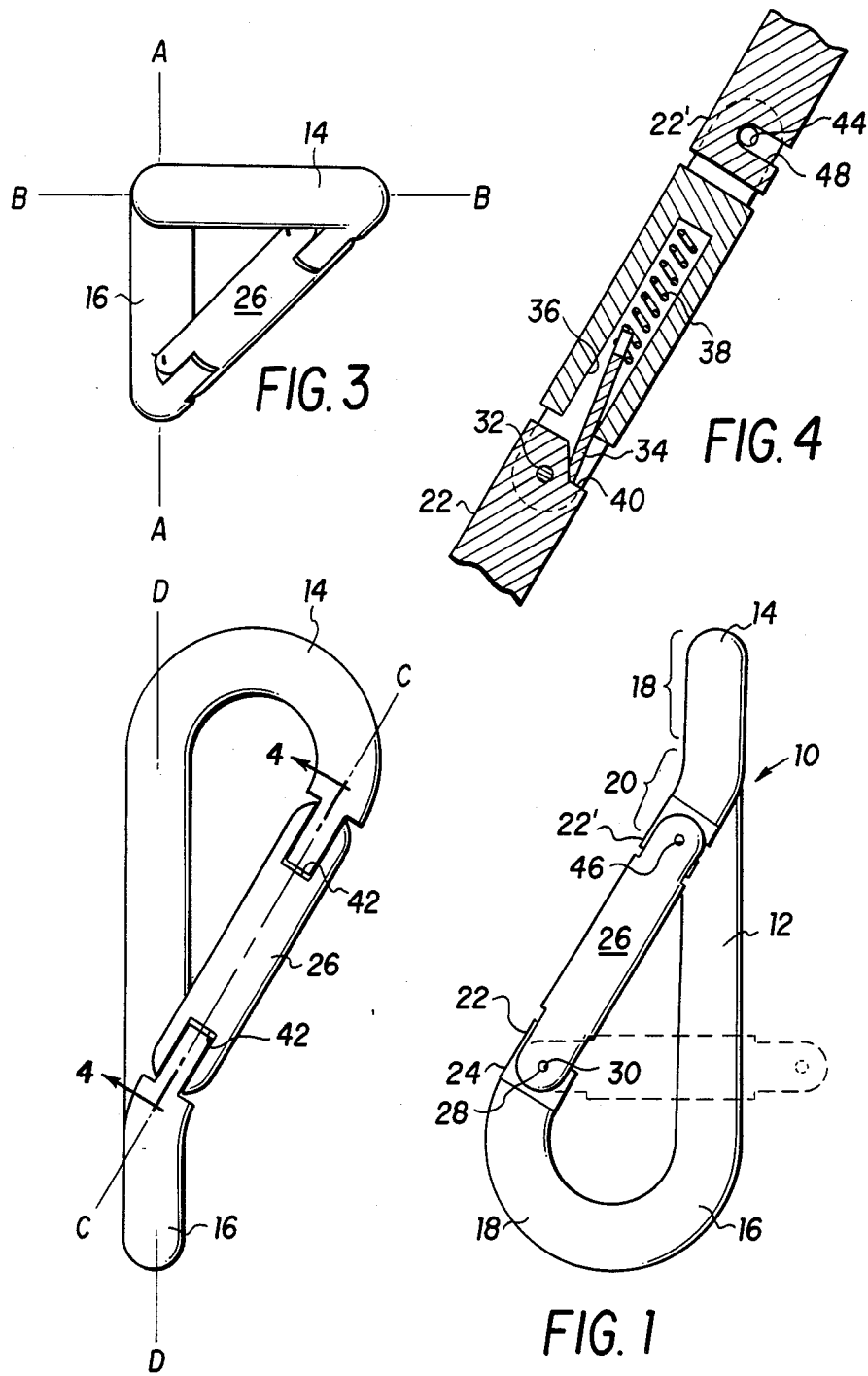

TWISTED CARABINER

BACKGROUND OF THE INVENTION

This invention relates generally to the art of clasps for climbing ropes, particularly to a carabiner for use by mountain climbers.

A carabiner is an oblong clasp usually used to connect a piston or link to a climbing rope in a way that allows relative sliding movement between the two. Carabiners may also be used to interconnect various pieces of climbing hardware.

The standard carabiner is an eliptical or D-shaped device formed from round aluminum or steel stock and having on one side a gate that can pivot inwardly, that is, toward the other side of the carabiner to admit a rope or strap. The standard carabiner lies substantially within a single plane, which requires that the bights or loops joined by the carabiner also be substantially coplanar.

In some instances coplanarity is not desired and in fact undesirable twisting of certain members could be avoided were opposite ends of the carabiner to be in approximately perpendicular planes rather than parallel ones. A particular instance is where the carabiner is connected between a piton attached to a wall, and a pulley. Current practice in such situations is to use two standard carabiners in series.

Accordingly, it is an object of this invention to provide climbers with a simple and inexpensive carabiner whose opposite ends lie in different planes.

An additional object of the invention is to provide such a carabiner with a gate whose orientation avoids interference between the gate and the opposite side of the carabiner, while nevertheless being properly oriented to prevent inadvertant disengagement of a rope from the carabiner. A related object is to enable the climber to install the clasp and then invert it while clipping into the devices so as to place the gate in a safe position against his body, thus preventing inadvertent gate opening.

SUMMARY OF THE INVENTION

A carabiner comprising a unitary body including a substantially straight back portion having a longitudinal axis, a pair of curved end portions extending from opposite ends of the back portion, each of said end portions comprising a proximal segment lying in a respective plane, the planes of the opposite proximal segments being substantially perpendicular to one another, and a distal segment bent out of the plane of its adjacent proximal segment and terminating at a tip substantially aligned with the tip of the opposite end portion along an axis that is skewed relative to the axis of the back portion, and further comprising a gate hinged to a first one of said tips, so as to be movable between open and closed positions, and having means for engaging the second of said tips, to form a closed loop.

BRIEF DESCRIPTION OF THE DRAWINGS

In the accompanying drawings:

FIG. 1 is a front elevation of a carabiner embodying the invention, taken along a line perpendicular to the plane of the lower end section thereof;

FIG. 2 is a left side elevation thereof;

FIG. 3 is a plan view thereof; and

FIG. 4 is an enlarged sectional view taken along the plane 4—4 in FIG. 2.

DESCRIPTION OF THE PREFERRED EMBODIMENT

With reference to FIGS. 1 and 2, the invention is embodied in a carabiner comprising a high-strength rigid body 10 formed from round metal stock. The body includes a substantially straight back portion 12 extending between arcuate upper and lower end portions 14 and 16 each comprising a proximal segment 18 adjacent the straight portion and a distal segment 20 more remote therefrom. Each proximal segment 18 follows a simple curve lying in a plane substantially perpendicular to the plane of the opposite proximal segment. This relationship is best seen in FIG. 3, where the planes of the proximal segments of the upper and lower ends are labelled A—A and B—B respectively. Each distal segment 20 is bent out of the plane of the adjacent proximal segment toward the opposite distal segment in such a way that their two tips 22, 22' are substantially aligned with one another along an axis C—C that is skewed with respect to the axis D—D of the back portion.

Each tip 22, 22' has lateral flats 24 on opposite sides thereof, as shown in FIG. 2.

A generally cylindrical gate 26 is pivotally supported on the tip 22 by a hinge pin 28, whose ends pass through aligned holes 30 in one end of the gate, the pin being pressed through a hole 32 in the tip 22. The gate is movable between a closed position shown in FIG. 1, and an open position, shown in phantom. The gate is biased toward either of these positions (away from a half-open position) by an over-center linkage comprising a pawl or spade 34 confined within a blind bore 36 that extends along the axis of the gate. A compression coil spring 38 biases the pawl outwardly, and its free end engages within a notch 40 cut out of the tip 22. The free end of the gate has a central slot 42 similar to the slot at the opposite end; a pin 44 is pressed through holes 46 at the end of the gate.

The lower tip 22', generally similar in shape to the head tip 22, has a slot 48 that open laterally toward the open position of the gate, in a position corresponding to that of the pin 44. The pin bottoms in the slot 48 when the gate is closed.

The carabiner may be used to interconnect various ropes, straps (e.g., seat harnesses), descenders (e.g., figure eights, stitch plates, etc.) or protection devices (e.g. pitons, anchor bolts, etc.). Referring to such items generically as "devices", the preferred method of use is as follows.

With his right hand, the climber grasps the carabiner, oriented, as the climber sees it, as in FIG. 1. With the back portion 12 in his palm, he opens the gate by moving it to the right with his thumb, then hooks the upper end 14 into the upper device. Now he closes the gate, and rotates the carabiner counterclockwise, as he sees it, until the end 14 is at the bottom. Now, reopening the gate, he hooks into the lower device. If the lower device is a seat harness, the gate remains near the climber's body, insuring that the gate will not be snagged or otherwise opened accidentally. If the upper device is a piton affixed to a rock wall, the gate remains on the side away from the wall, so that the gate is accessible. The carabiner tends to orient the loops of the devices to which it is attached at right angles, obviating the need to use a pair of carabiners.

It should be noted that the carabiner described above is adapted for right-hand use, and that mirror-image carabiners will be produced for left-handers.

Inasmuch as the invention is subject to various modifications it is intended that the foregoing description and accompanying drawings shall be interpreted as only illustrative of the invention, whose full scope is to be measured by the following claims.

I claim:

1. A carabiner comprising
a unitary body including
a substantially straight back portion having a longitudinal axis,
a pair of curved end portions extending from opposite ends of the back portion, each of said end portions comprising a proximal segment lying in a respective plane containing said longtudinal axis, the planes of the opposite proximal segments being substantially perpendicular to one another, and a distal segment bent out of the plane of its adjacent proximal segment and terminating at a tip substantially aligned with the tip of the opposite end portion along an axis that is skewed relative to the axis of the back portion; and further comprising
a gate hinged at one end thereof to a first one of said tips, so as to be movable between open and closesd positions, and having means at its other end for engaging the second of said tips, to form a closed loop.

2. The invention of claim 1, further comprising resilient means for biasing said gate toward its closed position.

3. The invention of claim 2, wherein said gate has an axial blind bore, said bore being closed at the free end end the gate, and wherein said biasing means comprises a compression spring bottomed in said bore, and a pawl in engagement with said spring and protruding from said bore, said pawl bearing against said first tip.

4. The invention of claim 1, further compriing resilient means for biasing said gate away from its half-open position, toward either its fully open or its fully closed position.

5. The invention of claim 4, wherein said gate has an axial blind bore closed at its free end, and wherein said biasing means comprises a compression spring bottomed in said bore and a pawl in engagement with said spring and protruding from said bore, said pawl bearing against said first tip.

6. A carabiner comprising
a unitary body including
a substantially straight back portion having a longitudinal axis,
a pair of curved end portions extending from opposite ends of the back portion, each of said end portions comprising a proximal segment lying in a respective plane, the planes of the opposite proximal segments being substantially perpendicular to one another, and a distal segment bent out of the plane of its adjacent proximal segment and terminating at a tip substantially aligned with the tip of the opposite end portion along an axis that is skewed relative to the axis of the back portion,
a gate hinged to a first one of said tips, so as to be movable between open and closed positions, and having means for engaging the second of said tips, to form a closed loop, and
means for biasing said gate away from its half-open position, toward either its fully open or its fully closed position,
wherein said gate has an axial blind bore closed at its free end, and wherein said biasing means comprises a compression spring bottomed in said bore and a pawl in engagement with said spring and protruding from said bore, said pawl bearing against said first tip, and
wherein said first tip has a notch therein for receiving said pawl, said notch being positioned so as to bias said gate away from its half-open position.

* * * * *